United States Patent
Edgar

(10) Patent No.: US 10,540,522 B2
(45) Date of Patent: Jan. 21, 2020

(54) STORING DATA SECURELY IN A DATABASE

(71) Applicant: Malcolm Angus Edgar, Avalon (AU)

(72) Inventor: Malcolm Angus Edgar, Avalon (AU)

(73) Assignee: AVOKA TECHNOLOGIES PTY LTD. (AU)

( * ) Notice: Subject to any disclaimer, the term of this patent is extended or adjusted under 35 U.S.C. 154(b) by 84 days.

(21) Appl. No.: 15/650,199

(22) Filed: Jul. 14, 2017

(65) Prior Publication Data

US 2019/0018982 A1 Jan. 17, 2019

(51) Int. Cl.
*H04L 29/06* (2006.01)
*G06F 21/62* (2013.01)
*G06F 21/31* (2013.01)

(52) U.S. Cl.
CPC .......... *G06F 21/6272* (2013.01); *G06F 21/31* (2013.01); *G06F 21/6227* (2013.01); *G06F 2212/163* (2013.01)

(58) Field of Classification Search
CPC ............. G06F 21/62; G06F 21/31; H04L 9/32
See application file for complete search history.

(56) References Cited

U.S. PATENT DOCUMENTS 7,111,005 B1 * 9/2006 Wessman ............... G06F 21/604
7,170,999 B1 * 1/2007 Kessler ................ G06F 21/606
380/201

OTHER PUBLICATIONS

AWS Key Management Service Developer Guide—available at: http://docs.aws.amazon.com/kms/latest/developerguide/kms-dg.pdf.

* cited by examiner

*Primary Examiner* — Wasika Nipa
(74) *Attorney, Agent, or Firm* — Tarolli, Sundheim, Covell & Tummino LLP

(57) ABSTRACT

Disclosed are methods, systems and one or more computer readable mediums for storing data securely in a database. In one aspect, transaction data received from a user completing a form is encrypted using a transaction key provided by a record key management server which is administered by a customer of a form hosting entity. An encrypted transaction key is also generated by the record key management server, wherein a record indicative of the encrypted transaction data and the encrypted transaction key is stored in a database administered by the form hosting entity. Data at rest stored in the database, including the record, is encrypted by a database key management server using a database key.

14 Claims, 5 Drawing Sheets

STORING DATA SECURELY IN A DATABASE

TECHNICAL FIELD

The present invention relates to a method, system, and one or more computer readable mediums for storing data securely in a database.

BACKGROUND

In the field of online data entry (also described here as form-based transactions), a constant goal for an organization is to store sensitive data securely within a database. There are constant concerns that the data which is stored in the database may be accessed by a malicious entity. There have been numerous instances where a malicious party has been able to compromise a database having stored therein sensitive data for a number of customers, where the contents of the database has been published on the Internet.

As such, there is a need to store data securely in a database which alleviates one or more of the disadvantages above.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavor to which this specification relates.

SUMMARY

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

In a first aspect there is provided a computer implemented method of storing transaction data in a database, wherein the method includes:

receiving, by a transaction manager application server administered by a form hosting entity, transaction data provided by a user completing an electronic form presented by user processing system;

transferring, from the transaction manager application server to a record key management server, a request to generate n transaction key, wherein the record key management server is administered by a customer of the form hosting entity;

generating, by the record key management server, the transaction key;

encrypting, by the record key management server, the transaction key with a master key, to generate an encrypted transaction key;

transferring, from the record key management server to the transaction manager application server, the transaction key and the encrypted transaction key;

encrypting, by the transaction manager application server, the transaction data using the transaction key to generate encrypted transaction data;

discarding, by the transaction manager application server, the transaction key;

storing, in the database, a record including the encrypted transaction data and the encrypted transaction key; and encrypting data at rest stored in the database using a database key stored by a database key management server administered by the form hosting entity, wherein the data at rest includes the record.

In certain embodiments, the method further includes retrieving, by the transaction manager application server from the database, a requested record, wherein the database key management server is configured to decrypt at least some of the data stored within the database using the database key.

In certain embodiments, the method further includes:

transferring a transaction key retrieval request, by the transaction manager application server to the record key management server, wherein the transaction key retrieval request is indicative of the encrypted transaction key retrieved as part of the requested record;

receiving, by the transaction manager application server from the record key management server, the transaction key; and decrypting, by the transaction manager application server, the transaction data of the requested record using the transaction key.

In certain embodiments, the method further includes the record key management server decrypting the encrypted transaction key indicated by transaction key retrieval request using the master key.

In certain embodiments, the method further includes the transaction manager application server receiving a plurality of instances of transaction data from a plurality of user processing systems operated by a respective plurality of users completing a respective plurality of instances of the electronic form, wherein multiple records are stored in the database for the multiple instances of transaction data.

In certain embodiments, the method further includes:

encrypting and decrypting, by the transaction manager application server, the multiple instances of transaction data of the multiple records using different transaction keys; and encrypting and decrypting, by the database key management server, the multiple records stored in the database at rest using the database key.

In certain embodiments, the method further includes encrypting and decrypting, by the record key management server, each transaction key using the master key.

In a second aspect there is provided a computerized system for storing transaction data in a database, wherein the computerized system includes a transaction manager application server administered by a form hosting entity which hosts an electronic form, a record key management server administered by a customer of the form hosting entity, a database key management server administered by the form hosting entity, and a database, wherein the computerized system is configured to:

receive, by the transaction manager application server, transaction data provided by a user completing the electronic form presented by user processing system;

transfer, from the transaction manager application server to the record key management server, a request to generate a transaction key, wherein the record key management server;

generate, by the record key management server, the transaction key;

encrypt, by the record key management server, the transaction key with a master key, to generate an encrypted transaction key;

transfer, from the record key management server to the transaction manager application server, the transaction key and the encrypted transaction key;

encrypt, by the transaction manager application server, the transaction data using the transaction key to generate encrypted transaction data;

discard, by the transaction manager application server, the transaction key;

store, in the database, a record including the encrypted transaction data and the encrypted transaction key; and encrypt data at rest stored in the database using a database key stored by a database key management server administered by the form hosting entity, wherein the data at rest includes the record.

In certain embodiments, the computerized system is further configured to retrieve, by the transaction manager application server from the database, a requested record, wherein the database key management server is configured to decrypt at least some of the data stored within the database using the database key.

In certain embodiments, the computerized system is further configured to:

transfer a transaction key retrieval request, by the transaction manager application server to the record key management server, wherein the transaction key retrieval request is indicative of the encrypted transaction key retrieved as part of the requested record;

receive, by the transaction manager application server from the record key management server, the transaction key;

decrypt, by the transaction manager application server, the transaction data of the requested record using the transaction key.

In certain embodiments, the computerized system is further configured to decrypt, by the record key management server, the encrypted transaction key indicated by transaction key retrieval request using the master key.

In certain embodiments, the computerized system is further configured to receive, by the transaction manager application server, a plurality of instances of transaction data from a plurality of user processing systems operated by a respective plurality of users completing a respective plurality of instances of the electronic form, wherein multiple records are stored in the database for the multiple instances of transaction data.

In certain embodiments, the computerized system is further configured to:

encrypt and decrypt, by the transaction manager application server, the multiple instances of transaction data of the multiple records using different transaction keys; and encrypt and decrypt, by the database key management server, the multiple records stored in the database at rest using the database key.

In certain embodiments, the computerized system is further configured to encrypt and decrypt, by the record key management server, each transaction key using the master key.

In a third aspect there is provided one or more non-transient computer readable mediums including executable instructions which configure a computerized system to store transaction data in a database, wherein the computerized system includes a transaction manager application server administered by a form hosting entity which hosts an electronic form, a record key management server administered by a customer of the form hosting entity, a database key management server administered by the form hosting entity, and a database, wherein execution of the executable instructions configure the computerized system to:

receive, by the transaction manager application server, transaction data provided by a user completing the electronic form presented by user processing system;

transfer, from the transaction manager application server to the record key management server, a request to generate a transaction key, wherein the record key management server;

generate, by the record key management server, the transaction key;

encrypt, by the record key management server, the transaction key with a master key, to generate an encrypted transaction key;

transfer, from the record key management server to the transaction manager application server, the transaction key and the encrypted transaction key;

encrypt, by the transaction manager application server, the transaction data using the transaction key to generate encrypted transaction data;

discard, by the transaction manager application server, the transaction key;

store, in the database, a record including the encrypted transaction data and the encrypted transaction key; and encrypt data at rest stored in the database using a database key stored by a database key management server administered by the form hosting entity, wherein the data at rest includes the record.

In certain embodiments, the computerized system is further configured, by the executable instructions, to retrieve, by the transaction manager application server from the database, a requested record, wherein the database key management server is configured to decrypt at least some of the data stored within the database using the database key.

In certain embodiments, the computerized system is further configured, by the executable instructions, to:

transfer a transaction key retrieval request, by the transaction manager application server to the record key management server, wherein the transaction key retrieval request is indicative of the encrypted transaction key retrieved as part of the requested record;

receive, by the transaction manager application server from the record key management server, the transaction key; and decrypt, by the transaction manager application server, the transaction data of the requested record using the transaction key.

In certain embodiments, the computerized system is further configured, by the executable instructions, to decrypt, by the record key management server, the encrypted transaction key indicated by transaction key retrieval request using the master key.

In certain embodiments, the computerized system is further configured, by the executable instructions, to receive, by the transaction manager application server, a plurality of instances of transaction data from a plurality of user processing systems operated by a respective plurality of users completing a respective plurality of instances of the electronic form, wherein multiple records are stored in the database for the multiple instances of transaction data.

In certain embodiments, the computerized system is further configured, by the executable instructions, to:

encrypt and decrypt, by the transaction manager application server, the multiple instances of transaction data of the multiple records using different transaction keys; and encrypt and decrypt, by the database key management server, the multiple records stored in the database at rest using the database key.

Other aspects and embodiments will be appreciated throughout the detailed description of the one or more preferred embodiments.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EXAMPLE EMBODIMENTS

The following modes, given by way of example only, are described in order to provide a more precise understanding of the subject matter of a preferred embodiment or embodiments.

Figure 1:
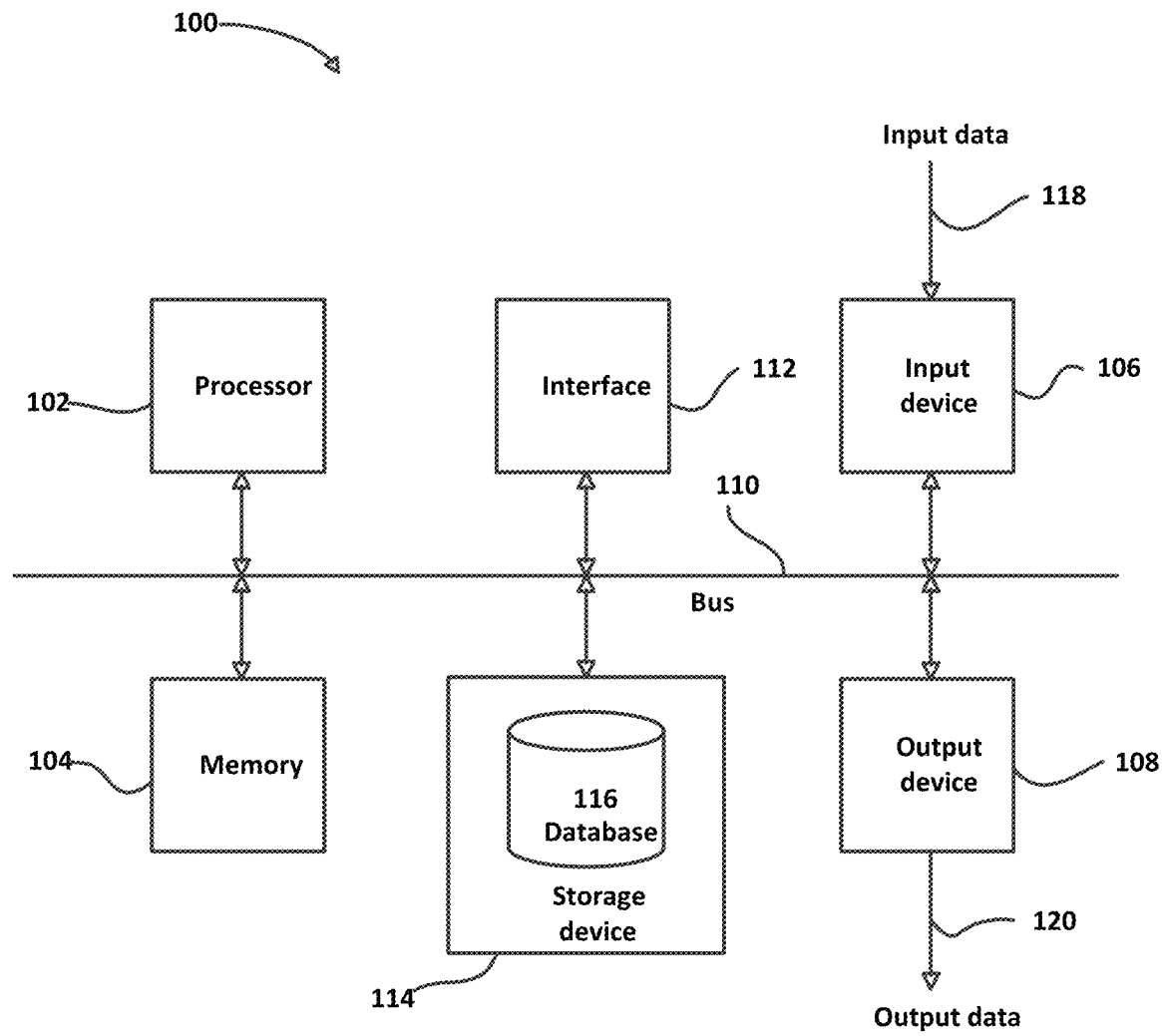
FIG. 1 illustrates a functional block diagram of an example processing device that can be utilized to embody or give effect to a particular embodiment.

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilizing output device 108. More than one input device 106 and/or output device 108 can be provided. It should be appreciated that the processing device 100 may be any form of terminal, PC, laptop, notebook, tablet, smart phone, specialized hardware, or the like.

Figure 2:
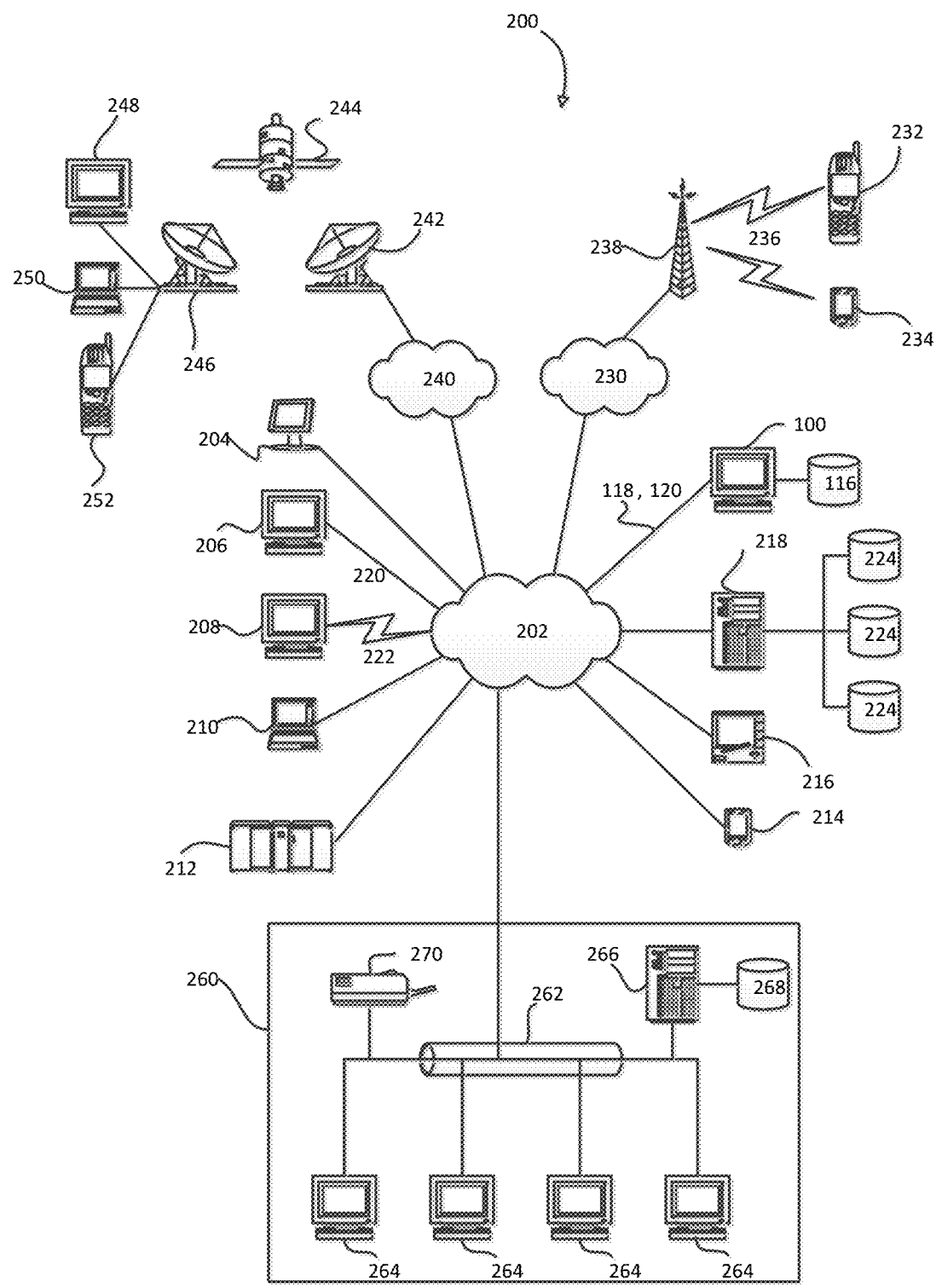
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilizing wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with Ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, Ethernet, token ring, FDDI ring, star, etc., networks, or mobile telephone networks, such as GSM, CDMA or 3G, etc., networks, and may be wholly or partially wired, including for example optical fiber, or wireless networks, depending on a particular implementation.

Figure 3:
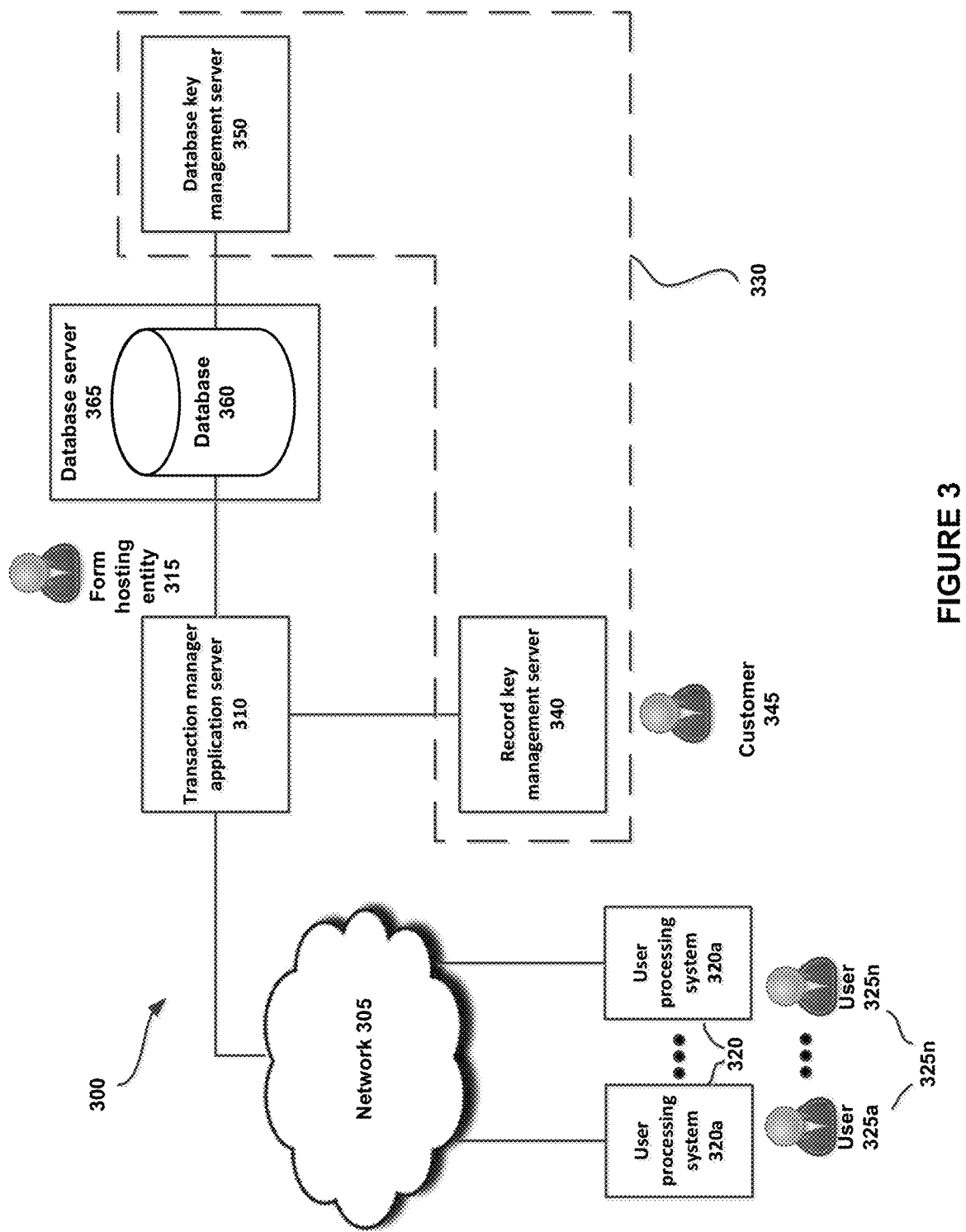
FIG. 3 is a functional block diagram representing an example system for storing transaction data in a database.

Referring to FIG. 3 there is shown a functional block diagram representing a system diagram of a system 300 for securely storing data in a database.

In particular, the system 300 includes a transaction manager application server 310 controlled by a form hosting entity 315, one or more user processing systems 320a-320n (generally referred to by reference 320) operated by one or more respective users 325a-325n (generally referred to by reference 325), a record key management server 340 providing a record key management service administered by a customer 345 of the form hosting entity 315, a database key management server 350 providing a database key management service administered by the form hosting entity 315, and a database 360 administered by the form hosting entity 360.

Generally, the customer 345 is a customer of the form hosting entity 315 providing hosting services for hosting the electronic form. In some embodiments, the form hosting entity 315 provides an electronic form design service to enable the customer 345 to design an electronic form using a form design server, accessible via the network such as the Internet, and to deploy the electronic form to the one or more users 325 and collect transaction data provided by the one or more users 325. Generally, the electronic form design service is available via an internet browser in order to allow the customer 345 to design the electronic form. The customer 345 can then elect to deploy the electronic form to the transaction manager application server 310 such that users are able to request and complete the electronic form.

In one particular form, the customer 345 may be a financial institution such as a bank or the like. In one embodiment, the customer 345 may wish to design their own online forms (such as loan application forms or the like) and the electronic form includes one or more fields for a user 325 to provide sensitive information such as sensitive financial information. As such, secure storage of this sensitive information is required. However, it will be appreciated that the customer 345 may relate to other industries. In other circumstances, the customer 345 may request the form hosting entity 315 to design the electronic form.

The transaction manager application server 310 is a virtual private cloud service administered by the form hosting entity 315. The transaction manager application server 310 can have stored in memory a computer program configuring the transaction manager application server 310 to generate and transfer form data indicative of the electronic form to the one or more user processing systems 320. The transaction manager application server 310 also is configured to collect and securely store, in the database 360, sensitive transaction data received from one or more user processing systems 320 operated by the one or more users 325.

The record key management server 340 and the database key management server 350 may be part of the same cloud server 330 or may be provided as separate servers. This optional arrangement is shown in broken line in FIG. 3. Importantly, the form hosting entity 315 administers the database key management service 350 and is only provided restricted access, via the use of credentials or the like, to the record key management service 340. The customer 345 administers the record key management service 340 and cannot validly access the database key management server.

The database 360 can be provided in the form of a relational database. Preferably, the system includes a database server 365 which controls access to the database 360.

Each user processing system 320 is preferably configured to present the electronic form via a web browser, wherein the respective user 325 operating the user processing system 320 can provide input, via an input device such as a keyboard or mouse. The browser is configured to transfer the captured transaction data securely to the transaction manager application server 310. In one form, the transaction manager application server 310 generates and transfers the electronic form to the user processing system 320 via HTTPS and similarly receives the transaction data via HTTPS. In one form, communication of the transaction manager application server 310, the record key management server 340, the database key management server 350, and the database server 365 uses TLS.

It will be appreciated that the above-mentioned processing systems of system 300 can be provided in the form of processing system 100 described in relation to FIG. 1 and can be part of a network system as discussed in relation to FIG. 2.

Communication between the user processing systems 320 and the transaction manager application server 310 is generally performed via a public network such as the Internet. However, communication between the transaction manager application server 310 and the record key management server 340, communication between the transaction manager application server 310 and the database server 365, and communication between the database server 365 and the database key management server 350 may be via a private computer network, a public computer network, or simply within memory as some or all of these components may be part of the same processing system.

Figure 4:
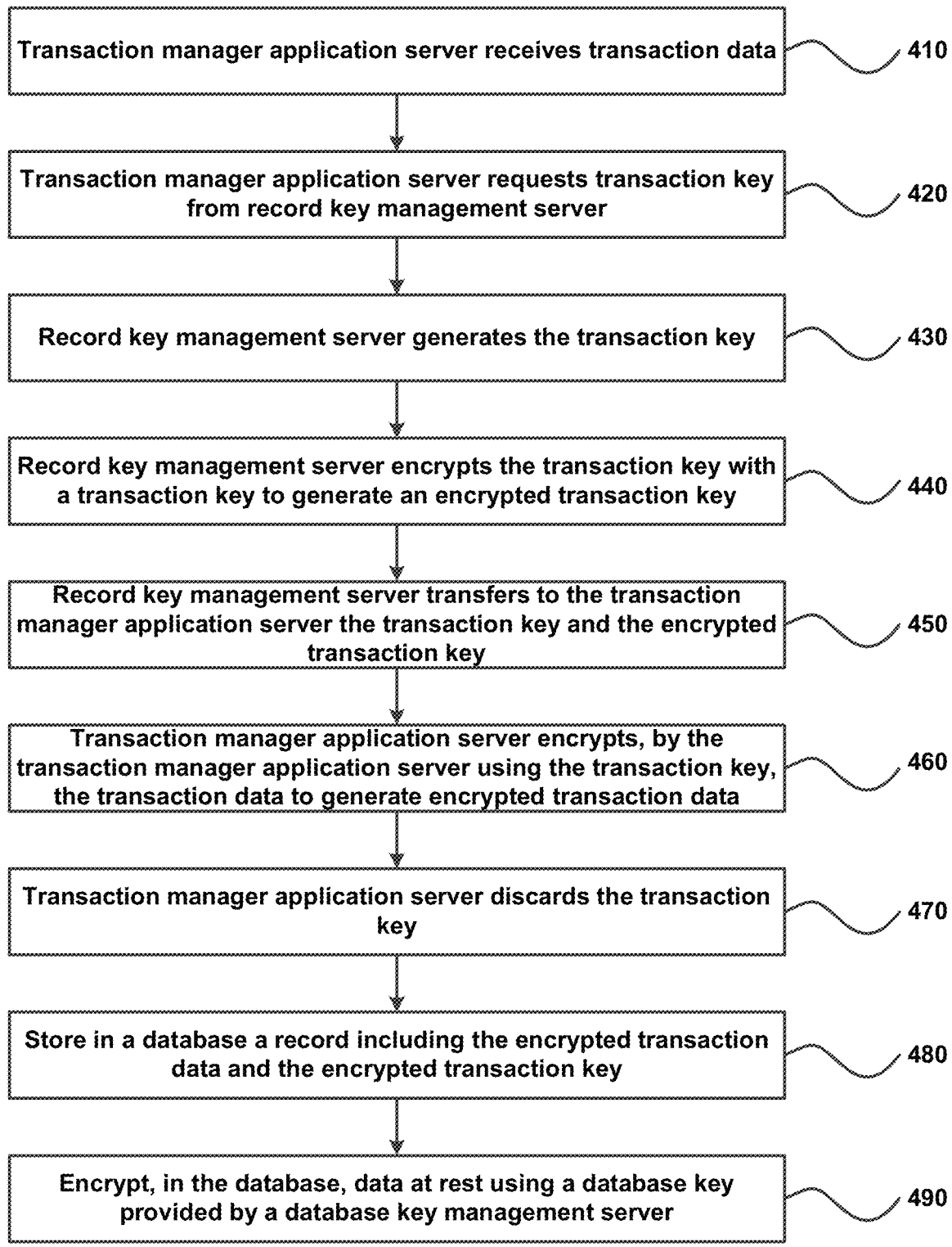
FIG. 4 is a flowchart representing a method for storing transaction data in a database.

Referring to FIG. 4 there is shown a flowchart representing a method 400 for storing data in the database 360. For the sake of clarity, this example will be discussed in relation to a single user 325 at a user processing system 320. However, as will be discussed in more detail below, the computerized system 300 and the method 400 performed by the computerized system 300 is intended to store transaction data from a plurality of users 325 operating a plurality of user processing systems 320.

In particular, at step 410 the method 400 includes receiving, by the transaction manager application server 310 administered by the form hosting entity 315, transaction data provided by the user at the respective user processing system 320. It will be appreciated that the transaction data may be received in multiple portions. For example, the transaction data may be provided in the form of a plurality of XML files, wherein completion of each page of a multi-page electronic form results in an XML file being generated by the web-browser executing the form data and transferred to the transaction manager application server 310. As such, the transaction data can include multiple XML files.

At step 420, the method 400 includes requesting, by the transaction manager application server 310, a transaction key from the record key management server 340 administered by the customer 345. Generally, an API function of the record key management server 340 is called by the transaction manager application server 310, wherein the API function can pass authentication information such as credentials which are used by the record key management server 340 to authenticate the form hosting entity 315.

At step 430, the method 400 includes generating, using the record key management server 340, in response to receiving the request, the transaction key. Preferably, the transaction key is randomly or pseudo-randomly generated. In one form, the transaction key is a symmetric key of a symmetric encryption/decryption algorithm such as a 256 bit key used in AES (Advanced Encryption Standard). However, it will be appreciated that other types of encryption algorithms can be used.

At step 440, the method 400 includes encrypting, by the record key management server 340, the transaction key with a master key, to generate an encrypted transaction key. The master key is unique and associated with the customer 345. The master key remains stored in a data store only accessible by the record key management server 340 administered by the customer 345. The master record key is not published and is not transferred by the record key management server to other components of the system 300. In one form, the record key management server 340 may rotate the master key such that multiple versions of the master key may be stored in the data store. As such, a current master key is used to encrypt the transaction key to generate the encrypted transaction key.

At step 450, the method 400 includes transferring, from the record key management server 340 to the transaction manager application server 310, the transaction key and the encrypted transaction key.

At step 460, the method 400 includes encrypting, by the transaction manager application server 310 using the transaction key, the transaction data to generate encrypted transaction data. The encrypted transaction data is a first portion of a record that eventually is stored in the database 360, wherein this first portion of the record is encrypted with the transaction key generated by the record key management service controlled by the customer 345.

At step 470, the method 400 includes the transaction manager application server 310 discarding the transaction key. For example, the transaction key is deleted from memory of the transaction manager application server 310.

At step 480, the method 400 includes storing, in the database 360, a record including the encrypted transaction data and the encrypted transaction key. As discussed above, the encrypted transaction key is encrypted using the master key and the encrypted transaction data is encrypted using the transaction key. As such, the record includes data which is encrypted using two different encryption keys. In certain embodiments, the encrypted transaction key is indicative of the version of the master key used for encryption. Alternatively, version data is stored in association with the encrypted transaction key which is indicative of the version of the master key used for encryption such that when decryption is required, the correct version of the master is used by the record key management server 340.

At step 490, the method 400 includes encrypting, by the database key management server 350, data at rest stored in the database 360. The data at rest includes the record stored in step 480. At this stage of the method 400, data stored in the database 360 is encrypted at a database level using a database key managed by the database key management server and each record in the database includes a first portion (i.e. the encrypted transaction data) which is encrypted using the respective transaction key and a second portion including the encrypted transaction key which is encrypted using the master key. This layering of encryption makes it more difficult for plain text transaction data to be accessed if the database 360 is compromised.

It will be appreciated that for each new electronic form that is completed by a user 325 of a user processing system 320 results in the transaction manager application server 310 requesting a new and unique transaction key from the record key management server 340. As such, each record is uniquely encrypted making it much more difficult for the transaction data to be published. Thus, in circumstances where the entire database 360 has been compromised due to the database key being determined by a malicious party resulting in the data at rest being able to be decrypted, the records contained in the decrypted data are each encrypted with different and unique transaction keys making the task of obtaining the decrypted plain text transaction data far more difficult. Furthermore, as the record and database key management services are administered by different and separate entities, it is more difficult for a malicious entity to compromise separately controllable portions of the overall computerised system 300. For example, whilst a phishing attack could be used by a malicious entity against the form hosting entity 315 to compromise the database 360, the malicious entity will also need to use one or more further attacks against the customer 345 in order for each encrypted transaction key to be decrypted which may be more difficult to achieve.

Figure 5:
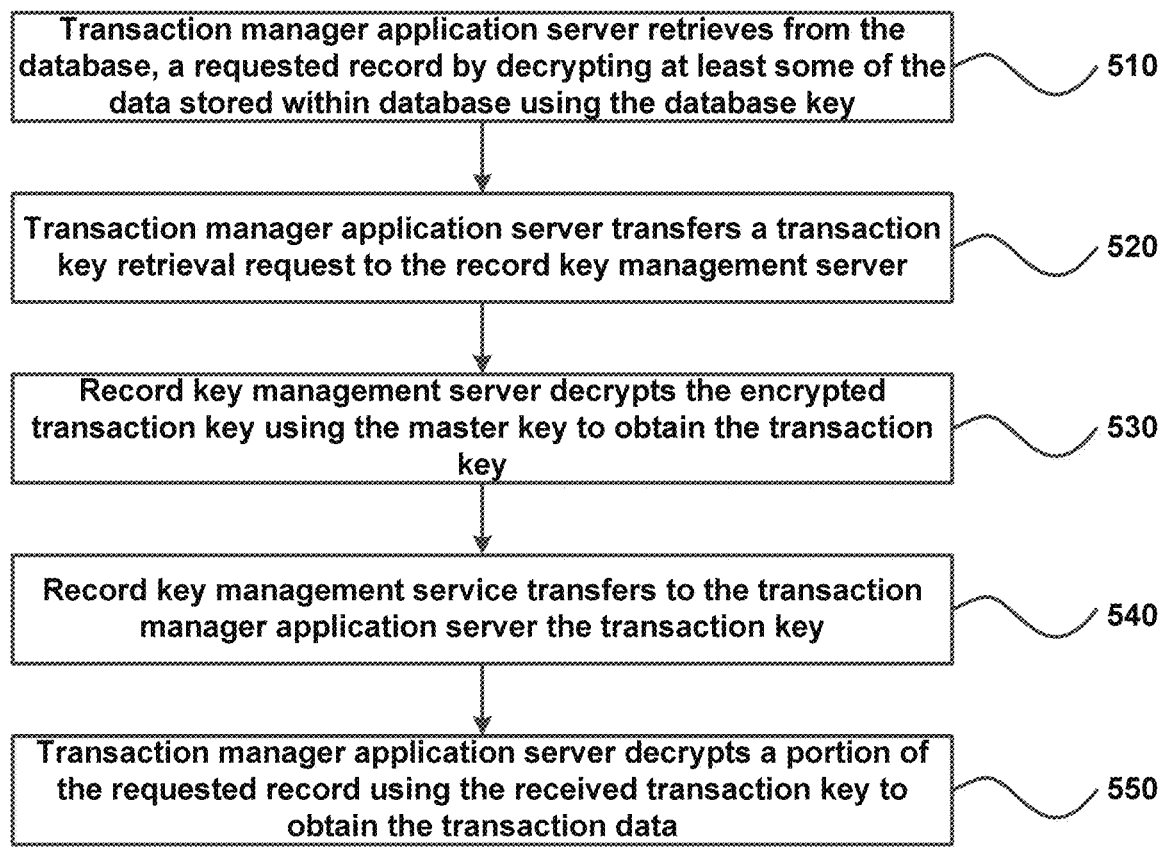
FIG. 5 is a flowchart representing a method for retrieving transaction data from the database.

Referring to FIG. 5 there is shown a further flowchart representing a method 500 of retrieving a record, or a portion of a record stored securely in the database 360 using the method 400 discussed in relation to FIG. 4.

In particular, at step 510 the method 500 includes retrieving, by the transaction manager application server 310 from the database 360, a requested record by decrypting at least some of the data stored within database 360 using the database key.

At step 520, the method 500 includes transferring a transaction key retrieval request, by the transaction manager application server 310 to the record key management server 340, wherein the transaction key retrieval request is indicative of the encrypted transaction key retrieved in step 510 as part of the requested record. The transaction key retrieval request can additionally be indicative of version data such that the correct version of the master key is used should key rotation be used by the record key management server 340.

At step 530, the method 500 includes decrypting, by the record key management server 340 using the master key, the encrypted transaction key to obtain the plain text transaction key.

At step 540, the method 500 includes transferring, from the record key management server 340 to the transaction manager application server 310, the plain text transaction key determined by decrypting the encrypted transaction key.

At step 550, the method 500 includes decrypting, by the transaction manager application server 310, a portion of the requested record. In particular, the portion of the requested record that is decrypted includes the encrypted transaction data received for a completed form, thus the decryption of the encrypted transaction data obtains the plain text transaction data.

Preferably, once the transaction data has been decrypted, the transaction manager application server 310 is configured to immediately discard the respective plain text transaction key such as deleting the respective transaction key from memory of the transaction manager application server 310. It will also be appreciated that once processing of the record has been completed, the plain text transaction data obtained by the transaction manager server 310 is discarded, such as deleting the respective plain text transaction data from respective memory.

It will be appreciated that the methods 400, 500 and system 300 described above can use a symmetric key algorithm for encryption and decryption. In one form, the symmetric key algorithm is Advanced Encryption Standard (AES). It will be appreciated that other symmetric key algorithms could be used.

It will be appreciated that one or more of the processing systems of system 300 can be distributed processing systems wherein multiple processing systems cooperate together to provide a service.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. Functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

The invention claimed is:

1. A computer implemented method of storing transaction data in a database, wherein the method includes:
receiving, by a transaction manager application server administered by a form hosting entity, transaction data provided by a user completing an electronic form presented by a user processing system;
transferring, from the transaction manager application server to a record key management server, a request to generate a transaction key, wherein the record key management server is administered by a customer of the form hosting entity;
generating, by the record key management server, the transaction key;
encrypting, by the record key management server, the transaction key with a master key, to generate an encrypted transaction key;

transferring, from the record key management server to the transaction manager application server, the transaction key and the encrypted transaction key;
encrypting, by the transaction manager application server, the transaction data using the transaction key to generate encrypted transaction data;
discarding, by the transaction manager application server, the transaction key;
storing, in the database, a record including the encrypted transaction data and the encrypted transaction key;
encrypting data at rest stored in the database using a database key stored by a database key management server administered by the form hosting entity, wherein the data at rest includes the record;
retrieving, by the transaction manager application server from the database, a requested record, wherein the database key management server is configured to decrypt at least some of the data stored within the database using the database key
transferring a transaction key retrieval request, by the transaction manager application server to the record key management server, wherein the transaction key retrieval request is indicative of the encrypted transaction key retrieved as part of the requested record;
receiving, by the transaction manager application server from the record key management server, the transaction key; and
decrypting, by the transaction manager application server, the transaction data of the requested record using the transaction key.

2. The computer implemented method according to claim 1, wherein the method includes the record key management server decrypting the encrypted transaction key indicated by transaction key retrieval request using the master key.

3. The computer implemented method according to claim 1, wherein the method includes the transaction manager application server receiving a plurality of instances of transaction data from a plurality of user processing systems operated by a respective plurality of users completing a respective plurality of instances of the electronic form, wherein multiple records are stored in the database for the multiple instances of transaction data.

4. The method according to claim 3, wherein the method includes:
encrypting and decrypting, by the transaction manager application server, the multiple instances of transaction data of the multiple records using different transaction keys; and
encrypting and decrypting, by the database key management server, the multiple records stored in the database at rest using the database key.

5. The method according to claim 4, wherein the method includes encrypting and decrypting, by the record key management server, each transaction key using the master key.

6. A computerized system for storing transaction data in a database, wherein the computerized system includes a transaction manager application server, including a processor coupled to a memory and communication interface, administered by a form hosting entity which hosts an electronic form, a record key management server, including a processor coupled to a memory and communication interface, administered by a customer which designs the electronic form, a database key management server, including a processor coupled to a memory and communication interface, administered by the form hosting entity, and a database, wherein the computerized system is configured to:

receive, by the communication interface of the transaction manager application server, transaction data provided by a user completing the electronic form presented by a user processing system;
transfer, from the communication interface of the transaction manager application server to the communication interface of the record key management server, a request to generate a transaction key, wherein the record key management server is administered by a customer of the form hosting entity;
generate, by the processor of the record key management server, the transaction key;
encrypt, by the processor of the record key management server, the transaction key with a master key, to generate an encrypted transaction key;
transfer, from the communication interface of the record key management server to the communication interface of the transaction manager application server, the transaction key and the encrypted transaction key;
encrypt, by the processor of the transaction manager application server, the transaction data using the transaction key to generate encrypted transaction data;
discard, by the processor of the transaction manager application server, the transaction key;
store, in the database, a record including the encrypted transaction data and the encrypted transaction key; and
encrypt data at rest stored in the database using a database key stored by a processor of a database key management server administered by the form hosting entity, wherein the data at rest includes the record;
retrieve, by the processor of the transaction manager application server from the database, a requested record, wherein the database key management server is configured to decrypt at least some of the data stored within the database using the database key;
transfer a transaction key retrieval request, via the communication interface of the transaction manager application server to the record key management server, wherein the transaction key retrieval request is indicative of the encrypted transaction key retrieved as part of the requested record;
receive, by the communication interface of the transaction manager application server from the record key management server, the transaction key; and
decrypt, by the processor of the transaction manager application server, the transaction data of the requested record using the transaction key.

7. The computerized system according to claim 6, wherein the computerized system is further configured to decrypt, by the processor of the record key management server, the encrypted transaction key indicated by transaction key retrieval request using the master key.

8. The computerized system according to claim 6, wherein the computerized system is further configured to receive, via the communication interface of the transaction manager application server, a plurality of instances of transaction data from a plurality of user processing systems operated by a respective plurality of users completing a respective plurality of instances of the electronic form, wherein multiple records are stored in the database for the multiple instances of transaction data.

9. The computerized system according to claim 8, wherein the computerized system is further configured to:
encrypt and decrypt, by the processor of the transaction manager application server, the multiple instances of transaction data of the multiple records using different transaction keys; and encrypt and decrypt, by the processor of the database key management server, the multiple records stored in the database at rest using the database key.

10. The computerized system according to claim 9, wherein the computerized system is further configured to encrypt and decrypt, by the processor of the record key management server, each transaction key using the master key.

11. One or more non-transient computer readable mediums including executable instructions which configure a computerized system to store transaction data in a database, wherein the computerized system includes a transaction manager application server administered by a form hosting entity which hosts an electronic form, a record key management server administered by a customer of the form hosting entity, a database key management server administered by the form hosting entity, and a database, wherein execution of the executable instructions configure the computerized system to:

receive, by the transaction manager application server, transaction data provided by a user completing the electronic form presented by a user processing system;

transfer, from the transaction manager application server to the record key management server, a request to generate a transaction key;

generate, by the record key management server, the transaction key;

encrypt, by the record key management server, the transaction key with a master key, to generate an encrypted transaction key;

transfer, from the record key management server to the transaction manager application server, the transaction key and the encrypted transaction key;

encrypt, by the transaction manager application server, the transaction data using the transaction key to generate encrypted transaction data;

discard, by the transaction manager application server, the transaction key;

store, in the database, a record including the encrypted transaction data and the encrypted transaction key;

encrypt data at rest stored in the database using a database key stored by a database key management server administered by the form hosting entity, wherein the data at rest includes the record;

retrieve, by the transaction manager application server from the database, a requested record, wherein the database key management server is configured to decrypt at least some of the data stored within the database using the database key;

transfer a transaction key retrieval request, by the transaction manager application server to the record key management server, wherein the transaction key retrieval request is indicative of the encrypted transaction key retrieved as part of the requested record;

receive, by the transaction manager application server from the record key management server, the transaction key; and decrypt, by the transaction manager application server, the transaction data of the requested record using the transaction key.

12. The one or more non-transient computer readable mediums according to claim 11, wherein the computerized system is further configured, by the executable instructions, to decrypt, by the record key management server, the encrypted transaction key indicated by transaction key retrieval request using the master key.

13. The one or more non-transient computer readable mediums according to claim 11, wherein the computerized system is further configured, by the executable instructions, to receive, by the transaction manager application server, a plurality of instances of transaction data from a plurality of user processing systems operated by a respective plurality of users completing a respective plurality of instances of the electronic form, wherein multiple records are stored in the database for the multiple instances of transaction data.

14. The one or more non-transient computer readable mediums according to claim 13, wherein the computerized system is further configured, by the executable instructions, to:

encrypt and decrypt, by the transaction manager application server, the multiple instances of transaction data of the multiple records using different transaction keys; and encrypt and decrypt, by the database key management server, the multiple records stored in the database at rest using the database key.

* * * * *